Feb. 9, 1926.
P. BURKE
1,572,230
SERVO MECHANISM
Filed July 31, 1925 2 Sheets-Sheet 2
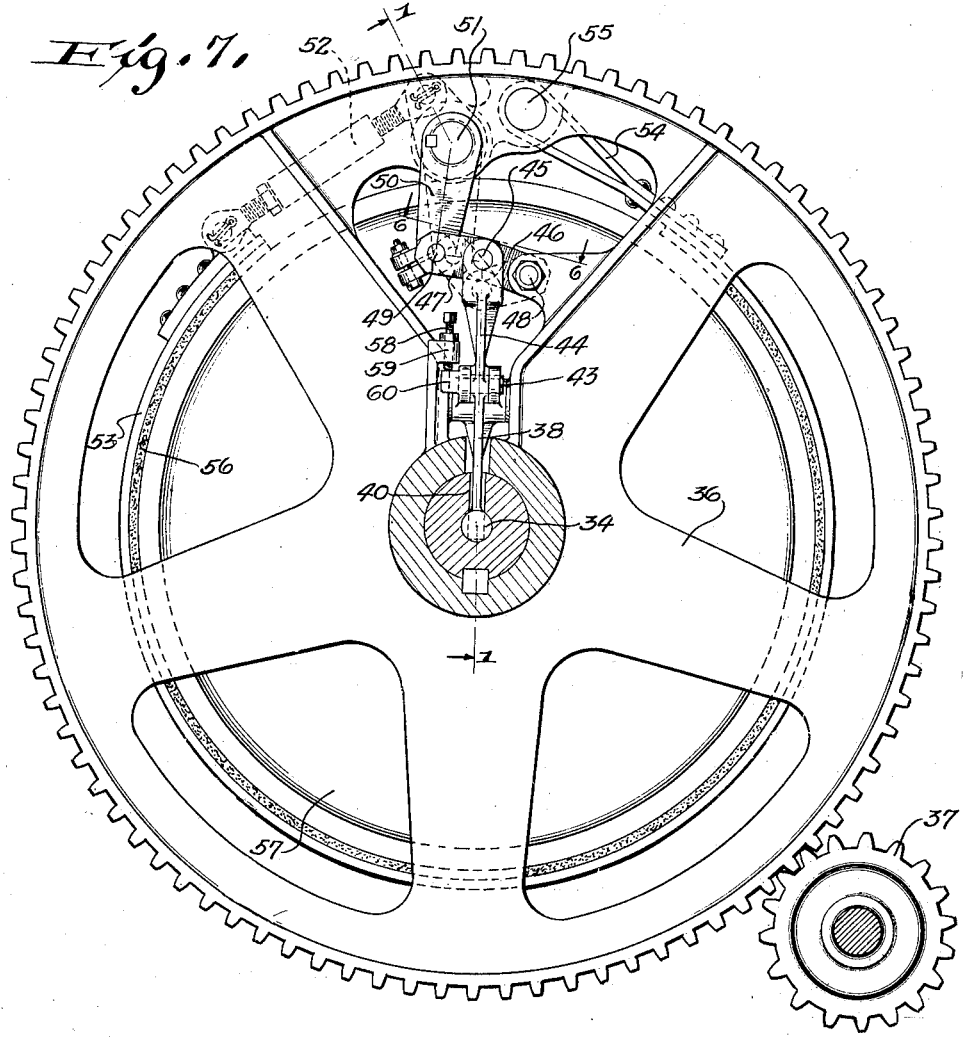
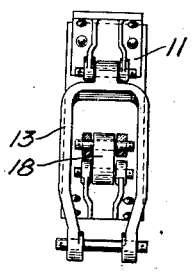
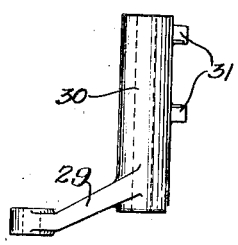
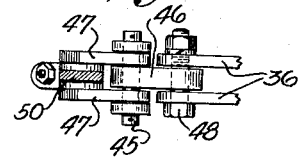
INVENTOR.
Paul Burke
BY
Charles & French
ATTORNEYS Patented Feb. 9, 1926.

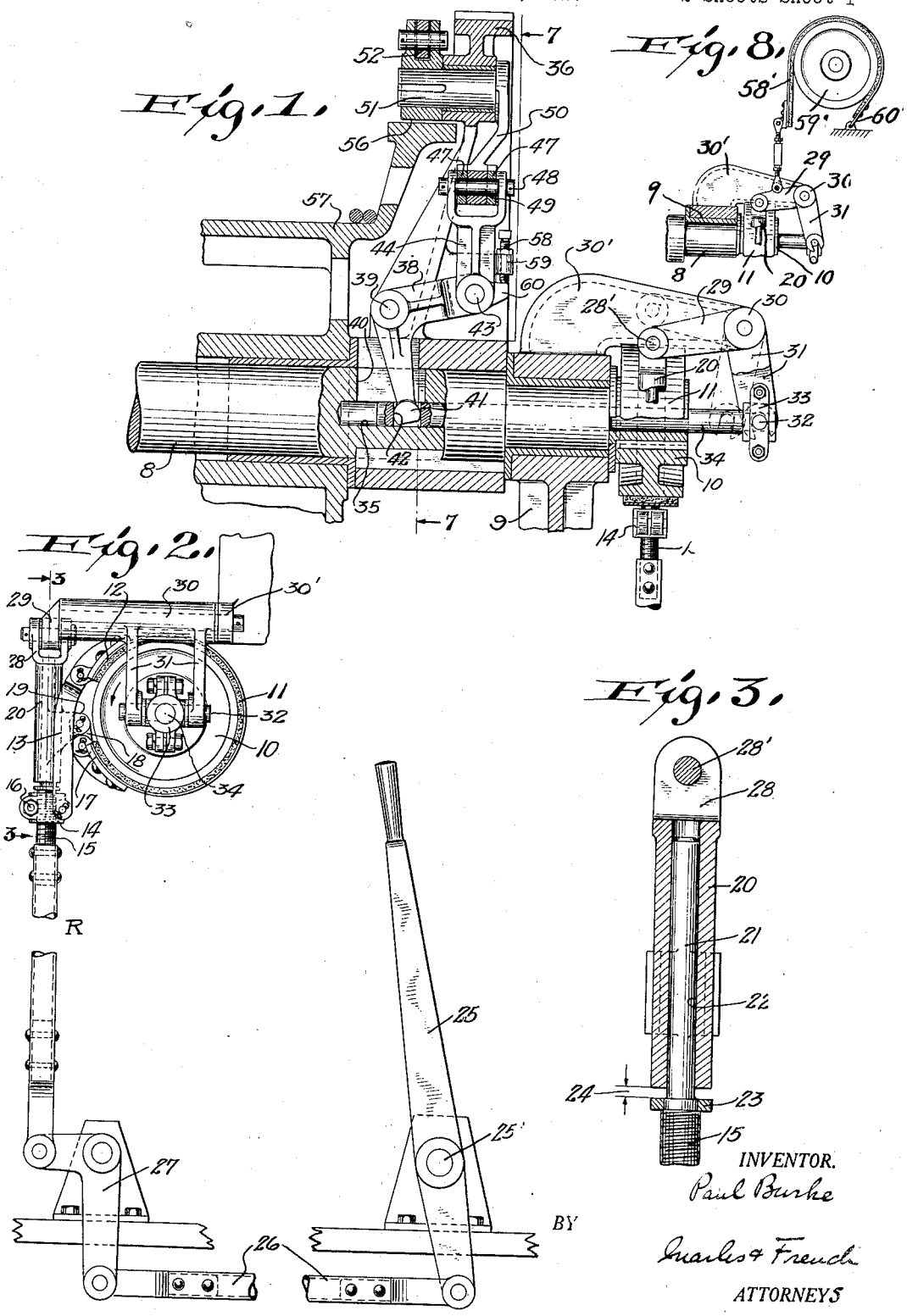

1,572,230

UNITED STATES PATENT OFFICE.

PAUL BURKE, OF GREEN BAY, WISCONSIN, ASSIGNOR TO NORTHWEST ENGINEERING COMPANY, OF GREEN BAY, WISCONSIN, A CORPORATION OF WISCONSIN.

SERVO MECHANISM.

Application filed July 31, 1925. Serial No. 47,332.

*To all whom it may concern:*

Be it known that I, PAUL BURKE, a citizen of the United States of America, and resident of Green Bay, in the county of Brown and State of Wisconsin, have invented new and useful Improvements in Servo Mechanism, of which the following is a description, reference being had to the accompanying drawings, which are a part of this specification.

The invention relates to servo mechanism for clutches or brakes.

In many forms of mechanism there are clutches or brakes to be operated which in certain applications involve a greater degree of muscular effort than the average man is capable of without undue fatigue. The object of this invention is to provide a servo mechanism operatively connected to the clutch or brake-applying mechanism whereby the operator's effort in applying the clutch or brake is supplemented by the action of the servo mechanism.

More particularly, the invention relates to the combination of an arrangement of the operating means with the servo friction band and the mechanism to be actuated.

The invention further consists in the several features hereinafter set forth and more particularly defined by claims at the conclusion hereof.

In the drawings: Fig. 1 is a sectional view of an apparatus embodying the invention, taken on the line 1—1 of Fig. 7, parts of the servo mechanism being broken away and parts being shown in side elevation;

Fig. 2 is an end view of the servo mechanism embodying the invention;

Fig. 3 is a detail sectional view taken on the line 3—3 of Fig. 2;

Fig. 4 is a side elevation view of parts shown in Fig. 2, with the parts shown in section;

Fig. 5 is a plan view of one of the levers actuated by the servo mechanism;

Fig. 6 is a detail sectional view taken on the line 6—6 of Fig. 7;

Fig. 7 is a sectional view taken on the line 7—7 of Fig. 1;

Fig. 8 is a side elevation view showing the servo mechanism associated with a brake.

In the drawings the numeral 8 designates a drive shaft driven from any suitable source of power and suitably journalled in bearings, one of which, designated by the numeral 9, is shown and has a servo friction drum 10 secured to rotate therewith. A servo friction band 11 cooperates with the drum 10.

The means for applying the band is shown more particularly in Fig. 2, in which one end 12 of the band is connected by a link 13, in the form of a yoke, to an adjustable nut 14 mounted on the threaded portion of a member 15 and adapted to be clamped thereto by a bolt 16. The other end 17 of the band is connected by a link 18 to ears 19 on a member 20 which, with the member 15, forms the operating rod R. The part 15 has an extension 21 slidably mounted in a bore 22 in the member 20 and a shoulder 23 engageable with the lower end of the member 20 to move said member with the part 15 during an upward movement of said part 15. The member 20 is connected to the mechanism to be operated by the servo mechanism. The parts 15 and 20 of the operating rod are in such adjustment by the positioning of the nut on the rod and the shoulder 23 relative to the member 20 that when the band 11 is fairly taut there will be a gap 24 between the lower end of member 20 and the upper surface of the shoulder 23 provided on member 15. Thus, the operating rod consists of two portions 15 and 20, movable relative to each other and together.

The part 15 of the operating rod is under the control of the operator and may be operated by him in any suitable manner, as by a lever 25 pivotally mounted at 25' on a fixed support intermediate its ends and connected at its lower end by a link 26 to one arm of a bell crank lever 27 whose other arm is pivotally connected to the lower end of the part 15 of the operating rod.

With this construction, when the operator swings the upper end of the lever 25 toward the left, the part 15 will be drawn downward, which produces a pull on the link 13 which in turn applies a tension upon the end 12 of the band 11 and brings it into engagement with the continuously rotating servo drum 10, so that this tension, augmented by the force the band receives from said drum, is transmitted to the end 17 of said band and through the link 18 to member 20, which moves downward to produce the actuation of the mechanism to be operated, such as a clutch or brake. After the engagement of the clutch or brake, of a duration demanded by the conditions of the work, the swinging of the lever 25 in a right-hand direction pushes the operating rod upwardly until the part 15 engages the part 20 so that both parts move together and the part 20 connected with the mechanism to be operated then releases the clutch or brake.

The clutch or brake-operating mechanism may be of any suitable form but in the case of a clutch I prefer the construction herein shown. As shown, the upper forked end 28 of the part 20 is connected by a pin 28' with one arm 29 of a bell crank lever 30 pivotally mounted on a fixed bracket 30' whose other arm consists of spaced arms 31 connected to pins 32 on a collar 33 mounted on the outer end of a shifter bar 34 which works in a bore 35 in the drive shaft 8. While the bar 34 may revolve relative to the collar 33, both parts move together longitudinally.

A member 36 is keyed to the shaft 8 and is here shown in the form of a gear meshing with a drive pinion 37 by which the drive of shaft 8 is effected, though said shaft may be driven in any other suitable manner. A bell crank lever 38 is pivotally mounted on a pin 39 carried by the member 36, and one arm works in a slot 40 in the shaft 8 and has a curved end 41 operatively engaged with the ends of a slot 42 in the bar 34. The outer arm of the lever 38 is pivotally connected by a pin 43 to one end of a link 44 whose other end carries a pin 45 which pivotally connects the adjacent ends of toggle links 46 and 47. The other end of the toggle link 46 is pivotally connected by a bolt 48 with the member 36. The other end of the link 47 is connected by a pivot pin 49 with one arm of a built-up bell crank lever 50 whose pin portion 51 is pivotally mounted in the member 36 and whose other arm is connected to the free end 52 of a clutch band 53. The other end 54 of this band is connected to the member 36 by an anchor pin 55. The band 53 cooperates with a friction surface 56 on a drum 57 loosely mounted on the shaft 8.

With this mechanism an outward movement of the bar 34 effected by the outward swinging movement of the lever, through the application of the servo band 11 to the drum, as previously described, swings the lever 38 in a direction to push up on the link 44 and hence move the toggle links 46, 47 upwardly from the dotted line position shown in Fig. 7 to the full line position, in which the links are toggled slightly beyond their line of centers to a "locked in" position and the link 47 has swung the lever 50 so as to exert tension in the free end of the band 53 and thus cause it to engage the drum 57 which then rotates with the shaft 8. To limit the movement of the toggle links in their "locked in" position, I have provided an adjustable screw 58 on a lug 59 of the member 36, engageable with an extension 60 of the lever 38 on its clutch-engaging movement. To release the clutch the operating rod R, actuating as above described, causes the member 20 to act directly on the lever 29 and move the shifter bar 34 inwardly and thus, through the lever 38, link 44, toggle links 46 and 47, swing the lever 50 to the dotted line position to positively release the clutch band 53.

When the band 11 is applied to the drum by the operator, the gap between the shoulder 23 and the lower end of member 20 is widened so that after the main clutch has been thrown in and is "locked" in position a movement of the operating lever toward release position will effect a release of the band 11 from the drum 10 without releasing the main clutch so that the servo band does not have to be continuously applied to its drum and hence is not subjected to the wear occasioned by a continuously applied servo band.

Where the servo mechanism above described is used to actuate a brake, the brake member is connected in any suitable manner with the lever 29 or with the part 20 of the operating rod, so as to receive its motion therefrom to apply or release the brake. For example, the free end of a brake band 58' cooperating with a driven member 59' may be connected to the arm 29 of the lever 30 and the other end 60' of said band anchored to a relatively stationary part to effect the application of said band to said drum on a downward movement of the operating rod R, assisted by the servo mechanism, and its release therefrom by the upward movement of said rod.

I desire it to be understood that this invention is not to be limited to any specific form or arrangement of parts except in so far as such limitations are specified in the claims or necessitated by the prior art.

What I claim as my invention is:

1. In servo mechanism, the combination with a power-driven shaft, of a friction drum on said shaft, a friction band coacting with said drum and being stationary before and after actuation, an operator-controlled member, and an operating rod including parts slidably movable relative to each other, one part of said operating rod being operatively connected to one end of said band and to said operator-controlled member and the other part of said operating rod being operatively connected with the other end of said band and to the mechanism to be actuated.

2. In servo mechanism, the combination with a power-driven shaft, of a friction drum on said shaft, a friction band coacting with said drum and being stationary before and after actuation, an operator-controlled member and an operating rod including parts slidably movable relative to each other, one part of said operating rod being operatively connected to said operator-controlled member and adjustably connected to one end of said band and the other part of said operating rod being operatively connected to the other end of said band and to the mechanism to be actuated.

3. In servo mechanism, the combination with a power-driven shaft, of a friction drum on said shaft, a friction band coacting with said drum and being stationary before and after actuation, an operator-controlled member, and an operating rod including relatively movable telescoping parts, one of said parts having a stop to engage and move the other part for release of the mechanism being actuated, one part of said operating rod being operatively connected to said operator-controlled member and to one end of said band, and the other part of said operating rod being operatively connected with the other end of said band and to the mechanism to be actuated.

4. The combination with main clutch mechanism including means for applying and positively releasing said clutch, of a power-driven shaft, a friction drum fixed on said shaft, a servo friction band coacting with said drum and being stationary before and after actuation, an operator-controlled member, an operating means for said first-named means including a pair of parts slidably movable relative to each other, each part associated with an end of said band, one of said movable parts being connected with said first-named means to transmit the force received from said band thereto to apply the clutch, the other of said movable parts being operatively connected to said operator-controlled member to effect the application of said servo band, said parts also being associated to move relative to each other under the action of said operator-controlled member to release said servo band and thereafter move together to cause said first-named means to effect a positive release of said main clutch mechanism.

In testimony whereof, I affix my signature.

PAUL BURKE.